United States Patent [19]
Odell

[11] Patent Number: 5,574,479
[45] Date of Patent: Nov. 12, 1996

[54] OPTICAL SYSTEM FOR DETERMINING THE ROLL ORIENTATION OF A REMOTE UNIT RELATIVE TO A BASE UNIT

[75] Inventor: Donald S. Odell, Burlington, Vt.

[73] Assignee: Selectech, Ltd., Williston, Vt.

[21] Appl. No.: 178,557

[22] Filed: Jan. 7, 1994

[51] Int. Cl.[6] ............................................. G09G 5/08
[52] U.S. Cl. ..................... 345/158; 345/166; 356/138; 356/152.1
[58] Field of Search ............................. 345/158, 180, 345/181, 169, 163, 166; 341/31; 348/734; 356/138, 139.05, 139.06, 139.07, 152.1

[56] References Cited

U.S. PATENT DOCUMENTS

| | | |
|---|---|---|
| 3,306,159 | 2/1967 | Beall, Jr. et al. . |
| 3,678,283 | 7/1972 | LaBaw . |
| 3,706,493 | 12/1972 | Redmann . |
| 3,707,434 | 12/1972 | Stayner . |
| 3,727,055 | 4/1973 | David et al. . |
| 3,778,163 | 12/1973 | Forward . |
| 3,867,629 | 2/1975 | Van Buskirk . |
| 4,123,165 | 10/1978 | Brown et al. . |
| 4,209,255 | 6/1980 | Heynau et al. . |
| 4,320,462 | 3/1982 | Lund et al. . |
| 4,396,945 | 8/1983 | DiMatteo et al. . |
| 4,506,354 | 3/1985 | Hansen . |
| 4,560,272 | 12/1985 | Harris ............................ 356/138 |
| 4,565,999 | 1/1986 | King et al. . |
| 4,576,481 | 3/1986 | Hansen . |
| 4,622,644 | 11/1986 | Hansen . |
| 4,626,892 | 12/1986 | Nortrup et al. . |
| 4,641,205 | 2/1987 | Beyers, Jr. . |
| 4,642,786 | 2/1987 | Hansen . |
| 4,653,102 | 3/1987 | Hansen . |
| 4,660,981 | 4/1987 | Stridsberg . |
| 4,684,249 | 8/1987 | Ellis . |
| 4,701,047 | 10/1987 | Eibert et al. . |
| 4,745,402 | 5/1988 | Auerbach . |
| 4,776,016 | 10/1988 | Hansen . |
| 4,796,019 | 1/1989 | Auerbach . |
| 4,823,170 | 4/1989 | Hansen . |
| 4,855,725 | 8/1989 | Fernandez . |
| 4,858,203 | 8/1989 | Hansen . |
| 4,923,303 | 5/1990 | Lutz . |
| 4,924,216 | 5/1990 | Leung . |
| 4,925,189 | 5/1990 | Braeunig . |
| 5,045,843 | 9/1991 | Hansen ............................ 345/180 |
| 5,059,958 | 10/1991 | Jacobs et al. . |
| 5,068,645 | 11/1991 | Drumm . |
| 5,142,506 | 8/1992 | Edwards . |
| 5,162,781 | 11/1992 | Cambridge . |
| 5,181,181 | 1/1993 | Glynn ............................ 345/163 |
| 5,452,413 | 9/1995 | Blades ............................ 395/159 |

FOREIGN PATENT DOCUMENTS

| | | |
|---|---|---|
| 0209411 | 1/1987 | France . |
| 62-52631 | 3/1987 | Japan . |

OTHER PUBLICATIONS

"Go Anywhere But Don't Leave Your Chair", Parade Magazine, Mar. 21, 1993, p. 18.

Primary Examiner—Richard Hjerpe
Assistant Examiner—Kent Chang
Attorney, Agent, or Firm—H. Jay Spiegel

[57] ABSTRACT

A system for determining the pointing orientation of a remote unit relative to a base unit. The fixed base unit comprises at least one light source for emitting at least one light beam, and a polarizer for polarizing light emitted by said light source in at least one particular predetermined orientation. The movable remote unit comprises a photodetector for detecting light emitted by said light source means of the fixed base unit and determining components of pitch, yaw and roll of the remote unit relative to the base unit. The remote unit transmits signals related to the pitch, yaw and roll to the base unit. Either the base unit or the remote unit may compute corrected pitch and yaw of the remote unit on the basis of the roll of the remote unit. The roll information may be used alone to rotate an icon in a graphical user interface on a television or computer screen.

24 Claims, 13 Drawing Sheets

SINGLE POLARIZATION BASE UNIT     FOUR POLARIZATIONS REMOTE UNIT

0 DEGREE     0,90,45,−45 DEGREE

FIG. 5B

FOUR POLARIZATIONS BASE UNIT     SINGLE POLARIZATION REMOTE UNIT

0,90,45,−45 DEGREE     0 DEGREE

FIG. 5C

TWO POLARIZATIONS BASE UNIT     TWO POLARIZATIONS REMOTE UNIT 0,90 DEGREE     0,45 DEGREE

FIG. 6

HORIZONTALLY POLARIZED INCIDENT LIGHT

FIG. 7
CALCULATED ROLL ANGLE
FOR QUAD POLARIZATION DETECTOR

OPTICAL SYSTEM FOR DETERMINING THE ROLL ORIENTATION OF A REMOTE UNIT RELATIVE TO A BASE UNIT

BACKGROUND OF THE INVENTION

The present invention relates to optical pitch yaw and roll tracking, and in particular to a system for tracking the position of a head or hand of a user for cursor control in interactive television and computer systems, and also for visual tracking display in virtual reality systems.

Remote wireless control of a cursor on a television screen or computer screen has become increasingly popular. See, for example, U.S. Pat. No. 5,045,843, incorporated herein by reference. Movements of a photodetector on a movable remote unit are detected with respect to a light beam source on a fixed base unit. Thus, the direction that the remote unit is pointing is determined and this information is used by the base unit to control the position of a cursor on a television screen or computer screen.

The photodetector on the movable remote unit detects the pointing orientation with respect to the light beam. This provides for two-dimensional orientation detection and signals related to the angular rotative and/or translational orientation between the light beam source and the photodetector are generated at the output of the photodetector. That is, the "pitch" and "yaw" of the remote unit are determined with respect to the light beam source of the base unit.

While the photodetector affords adequate pointing position detection of the remote unit relative to the base by determining relative pitch and yaw, it has been found that more accurate pointing orientation detection, and thus more precise cursor control, can be achieved if the "roll" of the movable remote unit is determined, to correct the determined "pitch" and "yaw" components. Moreover, information related to the roll of the remote unit has useful applications alone.

SUMMARY OF THE INVENTION

The present invention is directed to an optical tracking device in which the pitch, yaw and roll (hereinafter referred to as the "pointing orientation") of a remote unit are determined relative to a fixed base unit. The base unit emits a beam of light which is detected by at least one photodetector on the remote unit. The pointing orientation of the remote unit relative to the base unit is determined by measuring the impingement of the light beam on a photodetector surface. The remote unit may communicate back to the base unit wirelessly, or by a hardwired connection.

In one particular embodiment, the light emitted by the base unit is polarized in a single plane. The photodetector of the remote unit comprises an integrate pitch, yaw and roll detector. The pitch and yaw portion of the integrated detector comprises a quad detector which measures the intensity that the light beam hits each of four quadrants. The roll detector is a quad detector, each quadrant of which is responsive to light polarized in particular orientation, such as 0°, 90°, +45° and −45°, and roll is determined by measuring the light intensity sensed by each polarized quadrant. This embodiment allows for sensing over the range +/−90°. The pitch and yaw of the remote unit is corrected by the determined roll angle.

In another embodiment, a single polarized emitter is provided in the base unit and two polarized detectors are provided in the remote unit. The polarized detectors in the remote unit may be oriented at 0° and 45° and the base emitter polarized at 0°. This embodiment also allows for sensing over +/−90° range.

The remote unit communicates with the base unit, and the base unit may in turn be connected to various types of devices. For example, the base unit may connect to a television to form an interactive television system, or to a computer to provide remote cursor position control or icon position control, such as rotating a knob icon in a graphical user interface on a computer terminal screen or television screen. In addition, the remote unit may connect directly, or via an intervening base unit, with a virtual reality system to provide optical visual display tracking in the virtual reality system.

It is a primary object of the present invention to optically determine the pitch and yaw of a remote unit relative to a base unit for many purposes.

It is yet another object of the present invention to accurately determine the pitch and yaw of a remote unit relative to a base unit to precisely move a cursor, by correcting the pitch and yaw components at zero roll angle for a detected roll angle of the remote unit.

It is still another object of the present invention to optically determine the pointing orientation of a remote unit relative to a base unit in an interactive television system or computer cursor control system.

It is yet another object of the present invention to optically determine the pointing orientation of a remote unit relative to a base unit in a virtual reality system for visual display tracking.

It is still another object of the present invention to optically determine a roll angle of a remote unit relative to a base unit for rotating icons in a graphical user interface on a computer or television screen.

The above and other objects and advantages will become more readily apparent when reference is made to the following description taken in conjunction with the accompanying drawings.

DETAILED DESCRIPTION OF THE PREFERRED EMBODIMENTS

Figure 1:
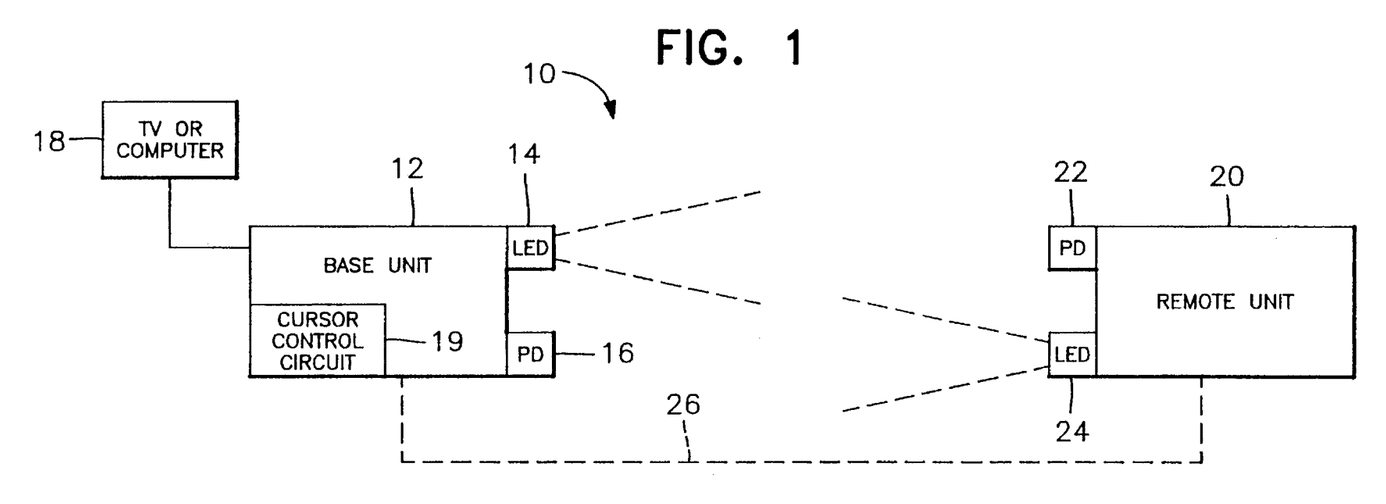
FIG. 1 is a block diagram of the optical pitch, yaw and roll tracking system used in an interactive television or computer system according to the present invention.

FIG. 1 shows the general configuration of a fixed base unit and a movable remote unit in an optical pointing system 10, useful in interactive television or computer system. The base unit 12 has a light beam source in the form of one (or several closely arranged) infrared LED 14 and a photodetector 16, and is positioned adjacent a television or computer screen 18 on which the position of a cursor is to be remotely controlled. A cursor control circuit 19 is also part of the base unit, for controlling the position of a cursor on the TV or computer screen. The remote unit 20 includes a photodetector 22 and an LED 24. The photodetector 22 is responsive to light emitted by the LED 14 and the pointing orientation of the remote unit is determined by the relative orientation of the photodetector 22 relative to the LED 14. Signals related to the orientation of the remote unit 14 are transmitted back to the base unit 12, either optically via the LED 24, or through a hardwire connection represented in phantom at 26.

Figure 2:
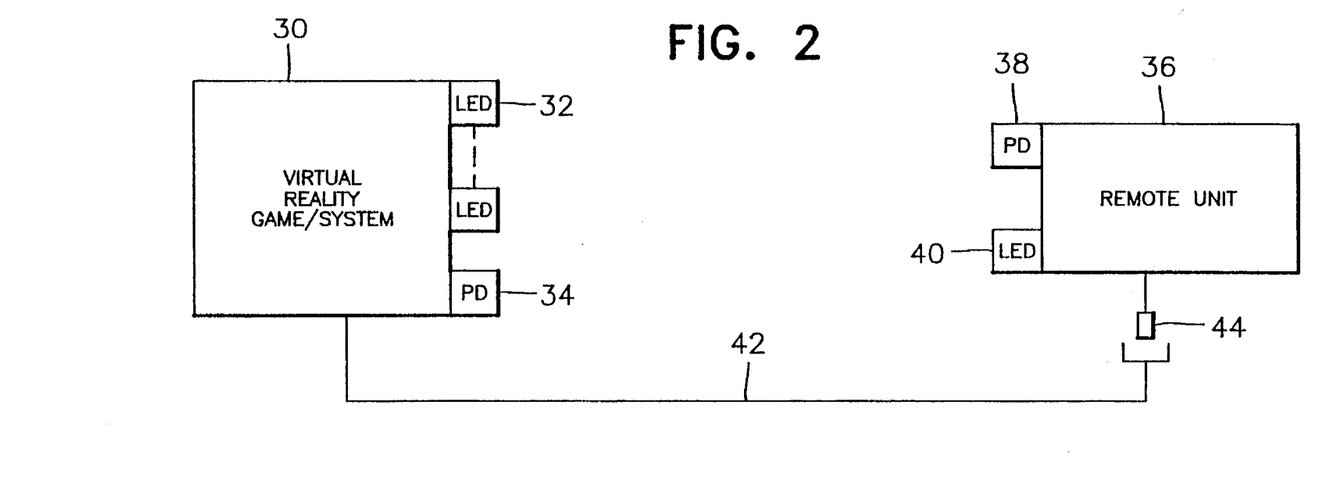
FIG. 2 is a block diagram of an optical pitch, yaw and roll visual tracking display in a virtual reality system according to the present invention.

FIG. 2 shows a virtual reality system 30 having an LED light source 32 comprising a single LED or an array of LED's, closely positioned so as to serve as a single light beam source, and a photodetector 34. A remote unit 36, which is similar to the remote unit 20 comprises a photodetector 38 and an LED 40. The remote unit 36 in the system configuration shown in FIG. 2 is used for real-time visual display tracking. The LED (or array of LED's) 32 emit light which is detected by the photodetector 38. The photodetector 38 generates pointing position signals which are transmitted either optically via the LED 40 to the photodetector 34, or via a hardwire connection 42. In some instances, the cable 42 will be preferred because of the much higher speed at which the pointing position signals can be transmitted over the cable. Indeed, most virtual reality systems have cable interconnections for remote head tracking devices. Therefore, the remote unit would be provided with a simple cable plug 44, which would mate with the cable 42.

The remote units shown in FIGS. 1 and 2 could be hand-held devices or head mounted devices.

Figure 3:
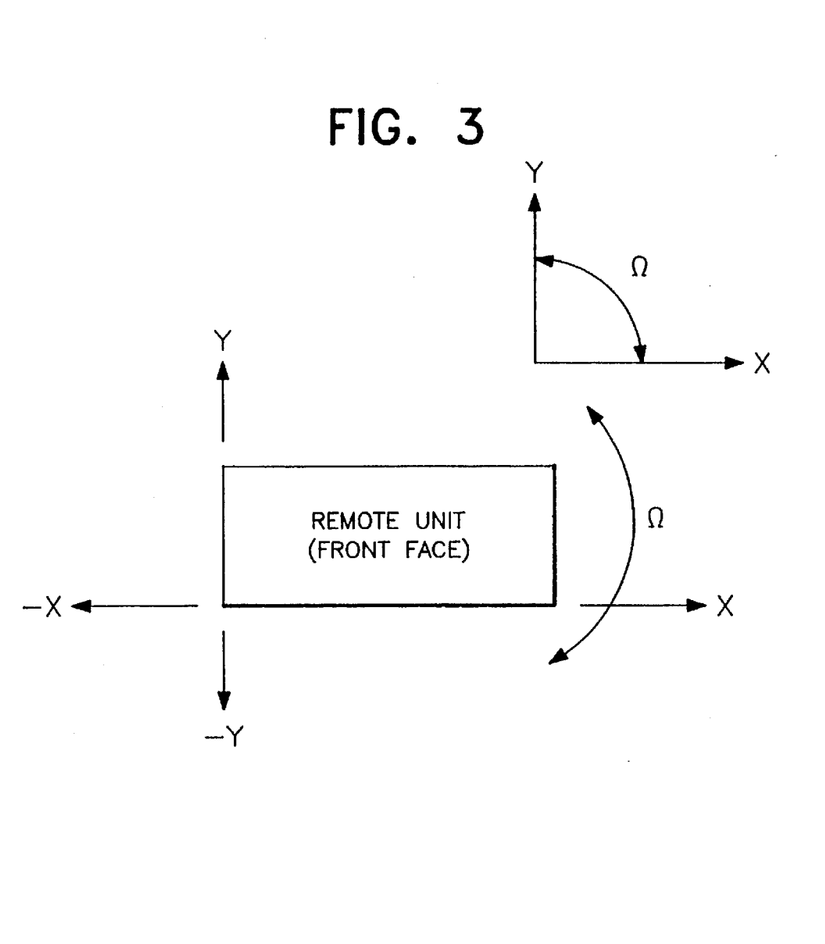
FIGS. 3 and 4 illustrate the pointing orientation of a remote unit, which is to be detected and transmitted to the base unit, in accordance with the present invention.
Figure 4:
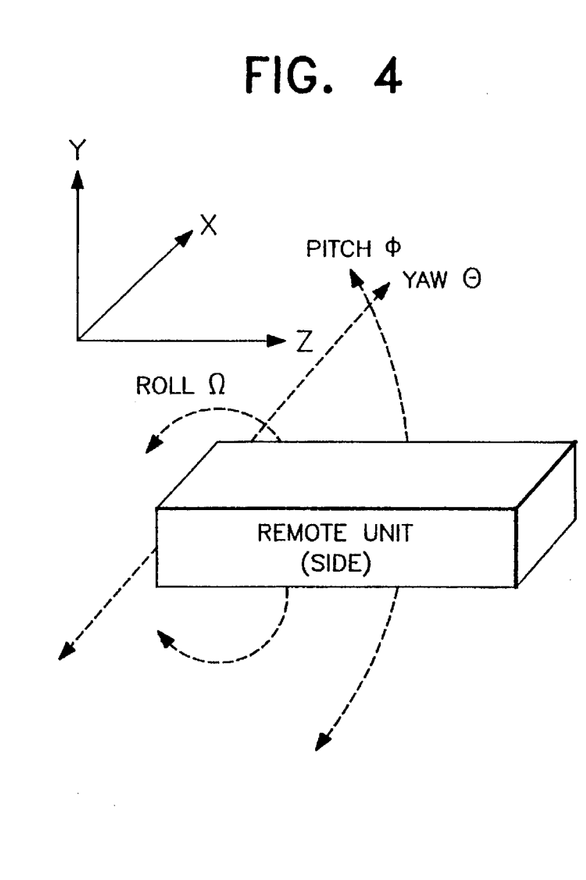

FIGS. 3 and 4 illustrate the geometry of the pointing orientation of the remote unit. The movement of the face of the remote upwards and downwards is the pitch $\Phi$ of the remote; side-to-side movement determines the yaw $\theta$ of the remote; and rotational movement of the remote determines the roll $\Omega$. As described in U.S. Pat. No. 5,045,843, pitch and yaw are determined by measuring the angle of incidence of a point source reference beam with respect to a sensor optical axis. The angular projections in the pitch and yaw directions are determined by measuring the projected light distances in each axis and transforming them to angular measurements by scaling with a lens constant:

$\Phi = Y \cdot l$ $\theta = X \cdot l$, where $\theta$ = Yaw Angle $\Phi$ = Pitch Angle X = Detected Distance in X axis on a Quad Photodetector Y = Detected Distance in Y axis on a Quad Photodetector l = Angular Lens Constant.

The measured pitch and yaw are most accurate for a roll angle of 0°. That is, the pitch and yaw information when the remote is at zero roll angle (perfectly aligned with the x-axis) is sufficient to precisely control the position of a cursor. However, if the remote is rotated then pitch and yaw alone cannot precisely move a cursor or follow the tracking of the remote unit. The addition of the roll component of orientation affords correction to the pitch and yaw information to provide more accurate values when the remote is not at a zero roll angle. The equations for pitch and yaw, corrected by the roll angle, are:

$$\Phi = Y \cdot l \, cos(\Omega) + x \cdot l \cdot sin(\Omega)$$

$\theta = x \cdot l \, cos(\Omega) - Y \cdot l \cdot sin(\Omega)$, where $\Omega$ is the detected roll angle.

In accordance with the present invention, polarized light is used to determine the roll angle of the remote unit with respect to the base unit. The roll angle is ultimately used to correct the pitch and yaw measurements, according to the equations above, so that very precise tracking of the remote unit can be made, to effect accurate cursor control in the application of interactive television, or accurate visual display tracking in the application of virtual reality systems. Alternatively, the roll angle may be used for rotating icons in a graphical user interface on a computer or televisions screen. This is explained in greater detail in conjunction with FIG. 14.

Figure 5A:
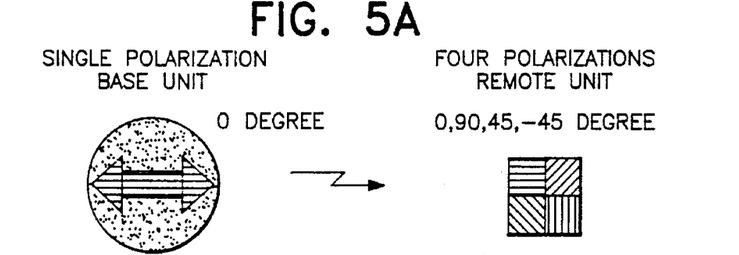
FIGS. 5A, 5B and 5C are diagrams of various light source-light detector configurations for roll detection.
Figure 5B:
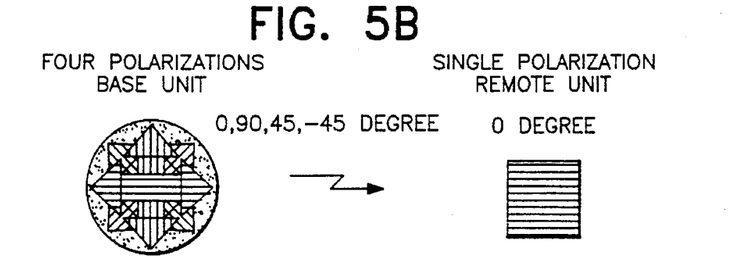
Figure 5C:
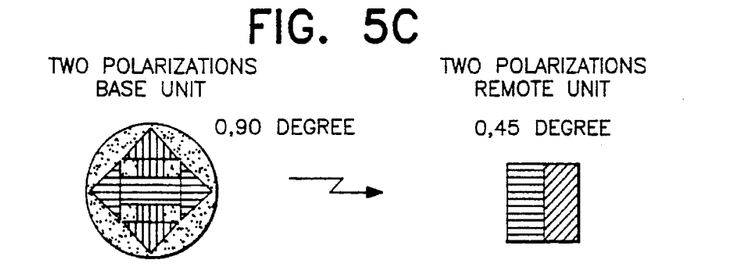

There are many ways to achieve full 180° roll angle detection. FIG. 5A illustrates a simple polarization emitter and detector configuration comprising a fixed polarization source and four uniformly illuminated polarization responsive sensors. The "polarized" nature of the emitter or detector may be achieved by placing a polarized plastic film in front of the detector or emitter. Alternatively, a polarized film may be deposited on the detector or emitter. FIG. 5B shows a single polarized detector in the remote unit, and four polarized emitters at 0°, +90°, +45° and −45° in the base unit. FIG. 5C shows a third configuration including two polarized detectors in the remote unit (0° and +45°) and two polarized emitters (0° and 90°) in the base unit.

Figure 6:
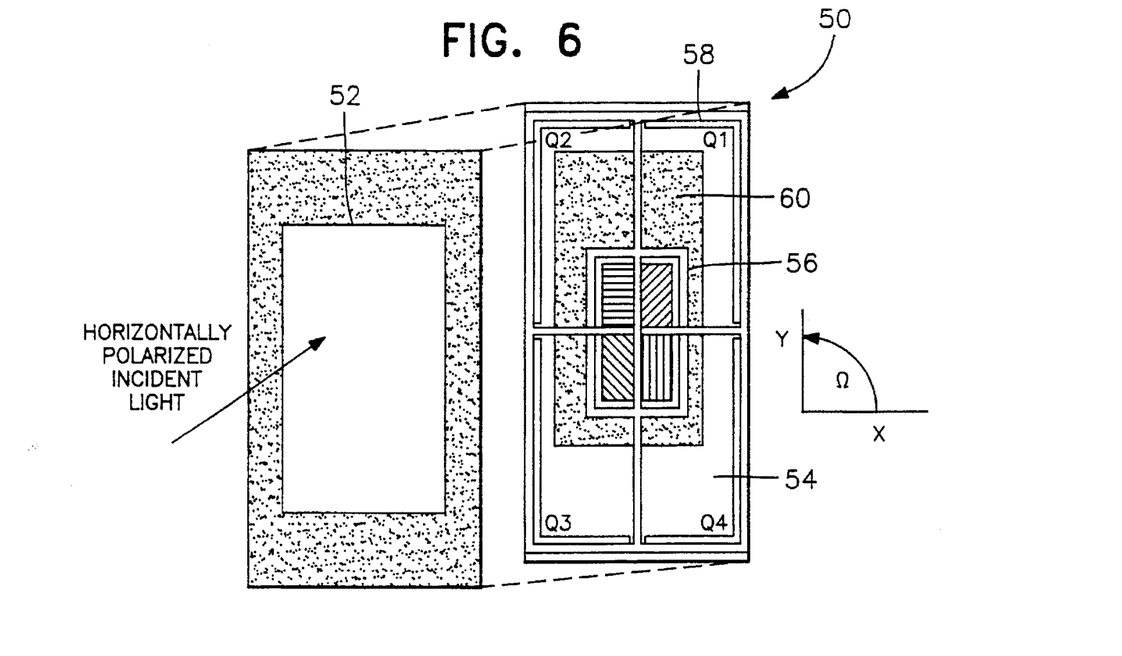
FIG. 6 is a front view of an integrated optical pitch, yaw and roll detector in accordance with a first exemplary embodiment of the present invention.

FIG. 6 illustrates an integrated pitch, yaw and roll detector 50 according to the present invention. The integrated detector 50 comprises a square aperture 52 which projects a square light spot onto a photodetector surface 54. The photodetector surface comprises four polarized detectors in an inner quad 56 which are always fully illuminated, and four unpolarized detectors in an outer quad 58 which receive light proportional to the incident angle of radiation (pointing angle). The projected light spot is shown at 60.

The X and Y components of the light spot on the photodetector surface 52 are calculated from intensities Q1–Q4 of the outer quad using the equations:

$$X = (Q1 + Q4 - Q2 - Q3)/(Q1 + Q2 + Q3 + Q4)$$

$$Y = (Q1 + Q2 - Q3 - Q4)/(Q1 + Q2 + Q3 + Q4).$$

The roll angle is computed using the inner quadrant intensities $I_0$, $I_{90}$, $I_{+45}$, $I_{-45}$. Specifically, a mathematical algorithm for determining the roll angle is:

If $I_0 > I_{90}$, then
$\Omega = Arctan[(I_{+45}/I_{-45})^{1/2}] - 45°$.

If $I_0 > I_{90}$ and $I_{+45} < I_{-45}$, then $$\Omega = -\text{Arctan}[(I_{+45}/I_{-45})^{1/2}].$$

Otherwise, $$\Omega = -\text{Arctan}[(I_{+45}/I_{-45})^{1/2}] - 135°.$$

This procedure yields two response functions for the difference angle between −90° and +90°. The overall difference or roll angle is derived by using the most well defined section from each orthogonal sensor pair. This corresponds to the nearly linear section in the intensity curves:

$0.15 < I_0/(I_0+I_{90}) < 0.85$,
$0.15 < I_{+45}/(I_{+45}+I_{-45}) < 0.85$.

In the transition regions, $0.10 < I_0/(I_0+I_{90}) < 0.20$,
$0.80 < I_{+45}/(I_{+45}+I_{-45}) < 0.90$,
$0.80 < I_0/(I_0+I_{90}) < 0.90$, and
$0.10 < I_{+45}/(I_{+45}+I_{-45}) < 0.20$.

Figure 7:
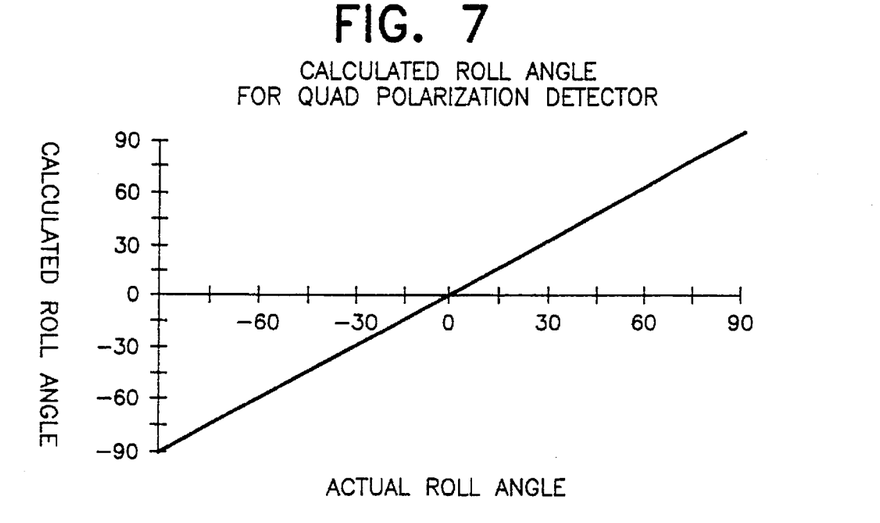
FIG. 7 is a graphical representation of the function for determining the roll angle from a quad roll detector according to the present invention.

An average of the roll angle from each sensor pair is used. A smoothing function may be applied to eliminate any discontinuity in the functions. FIG. 7 illustrates the graph of the overall function.

The computations of the corrected pitch and yaw angles may be performed in the base unit 12, but can alternatively be performed in the host computer (virtual reality system), or in the remote unit if it has adequate computational capabilities. If the remote unit is to perform the computations, it would include a microprocessor chip or other computing chip to perform such computations. In the present exemplary embodiment, the remote unit detects values for Q1–Q4, and $I_0$, $I_{+45}$, $I_{-45}$, and $I_{90}$, and transmits these values to the base unit which processes them to ultimately determine the corrected pitch and yaw angles, and to thereby move the position of the cursor in the case of an interactive television system, or adjust the visual display tracking in the case of a virtual reality system. However, it is also envisioned that the pitch, yaw and roll values can be computed in the remote unit using the same algorithm, and therefore only the computed pitch, yaw and roll data need to be transmitted to the base unit or host computer.

Figure 8:
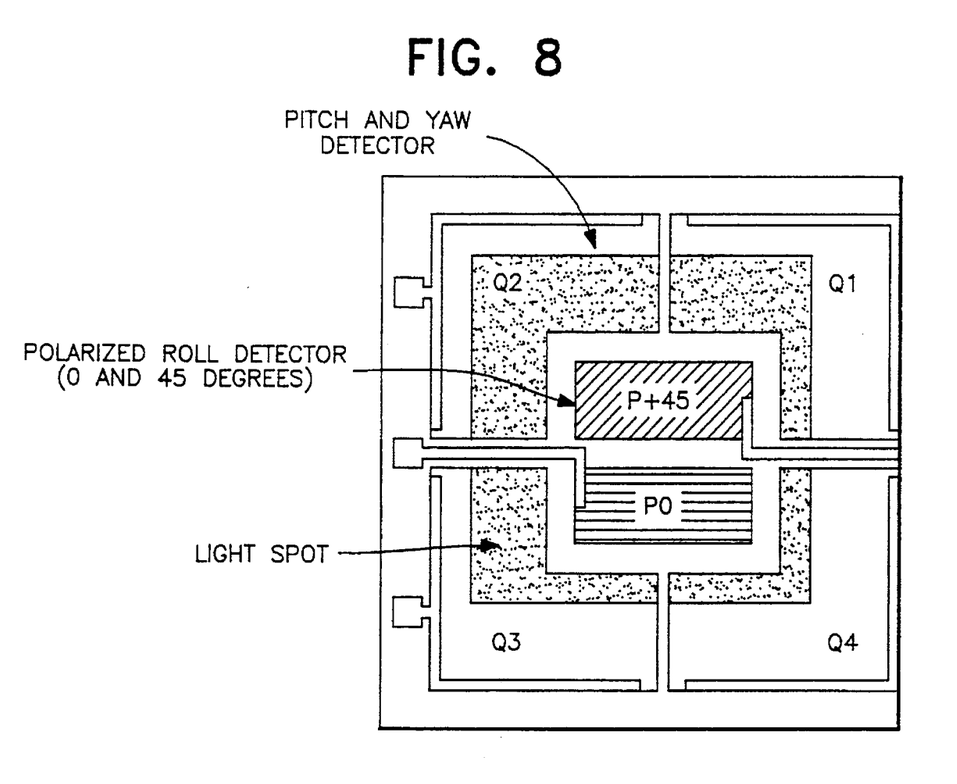
FIG. 8 is a front view of an integrated optical pitch, yaw and roll detector according to a second exemplary embodiment of the present invention.

According to another exemplary embodiment of the invention, roll detection may be achieved with a single emitter in the base unit and only two polarized detectors in the remote unit instead of two quadrature pairs. FIG. 8 illustrates this other integrated photodetector. The reason for using two quadrature pairs is to eliminate the need to know the 0° polarization intensity. This can be calculated from the unpolarized light intensities detected by the unpolarized pitch and detectors.

The remote polarized detectors would be oriented at 0° and 45° and the base polarized emitter oriented at 0° to allow sensing over the same +/−90° range.

Referring to FIG. 8, the total light intensity incident on the detector is proportional to the aperture area ($A_a$), $$I_t = k \cdot A_a.$$

The portion received by the polarized detectors is $$I_0 = I_t \cdot A_p/A_a \cdot \cos^2(\Omega_0) = k \cdot A_p \cdot \cos^2(\Omega_0),$$

$$I_{+45} = k \cdot A_p \cdot \cos^2(\Omega_{+45}),$$

where $A_p$ is the area of each polarized detector and $\Omega_0$ and $\Omega_{+45}$ represent the roll relative to each polarized detector. Neglecting detector isolation areas, the total light received by the unpolarized quadrants is $\Sigma I_q = k \cdot (A_a - 2A_p)/A_a$. Since k is constant for a given measurement cycle, it may be eliminated from the previous three equations so that $$\Omega_0 = +/- \cos^{-1}\{(A_a - 2A_p)/A_p \cdot I_0/\Sigma I_q\}^{1/2},$$

$$\Omega_{+45} = +/- \cos^{-1}\{(A_a - 2A_p)/A_p \cdot I_{+45}/\Sigma I_q\}^{1/2}.$$

An algorithm for calculating the actual roll ($\Omega$) from the detected roll ($\Omega_0$ and $\Omega_{+45}$) is:

```
If |Ω₀| ≤ 22.5
    then Ω = −|Ω₊₄₅| + 45
Else if 22.5 ≤ |Ω₀| ≤ 67.5
    and if |Ω₊₄₅| ≤ 45
        Ω = |Ω₀|
    else
        Ω = −|Ω₀|
Else (if |Ω₀| ≥ 67.5)
    and if |Ω₊₄₅| ≤ 45
        Ω = |Ω₊₄₅| + 45
    else Ω = |Ω₊₄₅| − 135
```

Figure 9A:
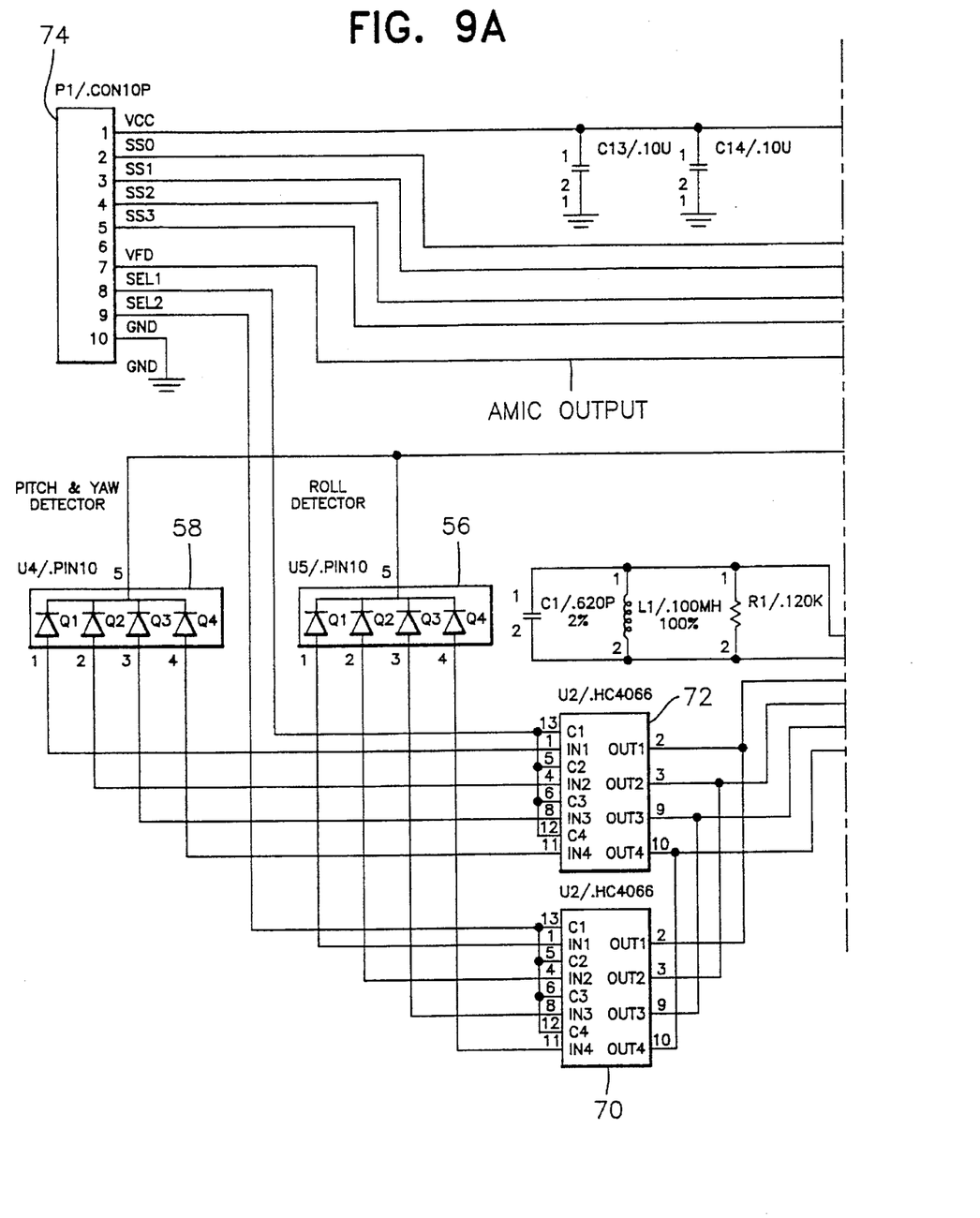
FIGS. 9 and 10 are schematic diagrams of the remote unit in accordance with the present invention.
Figure 9B:
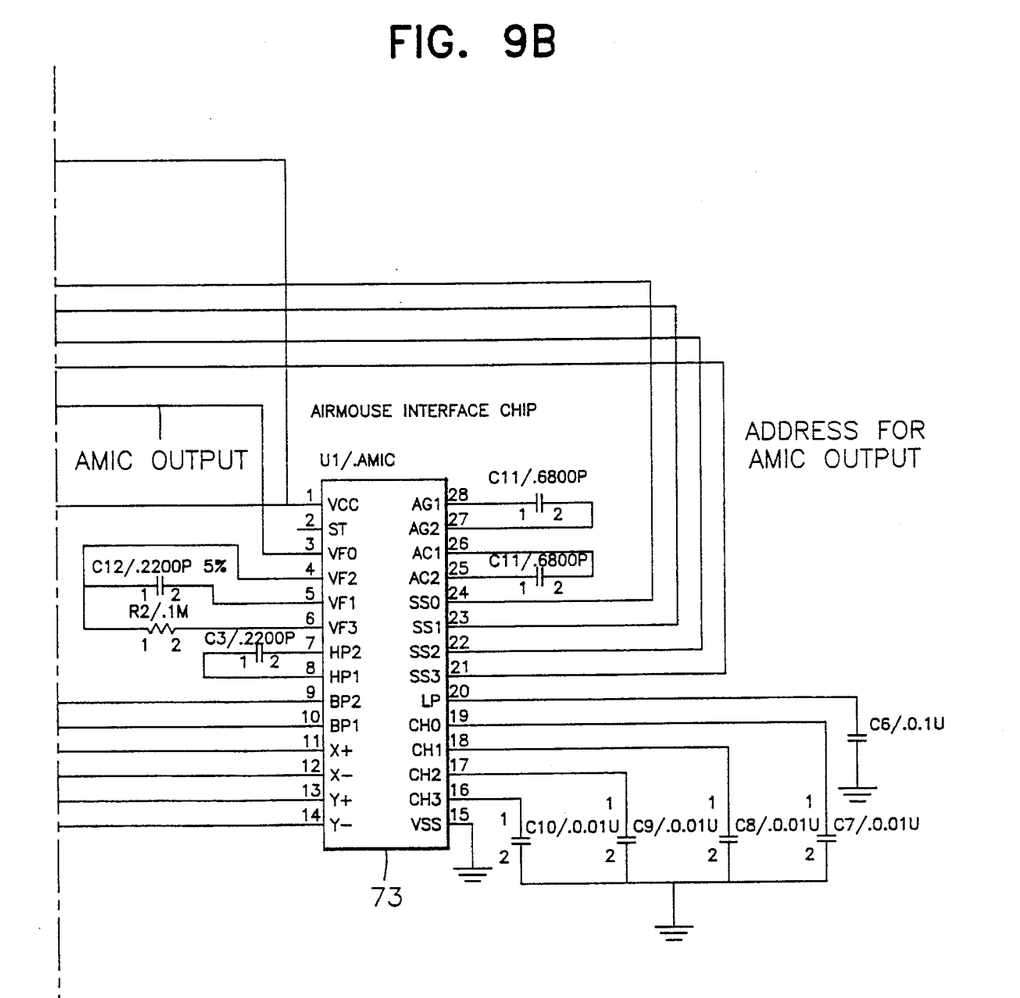
Figure 10A:
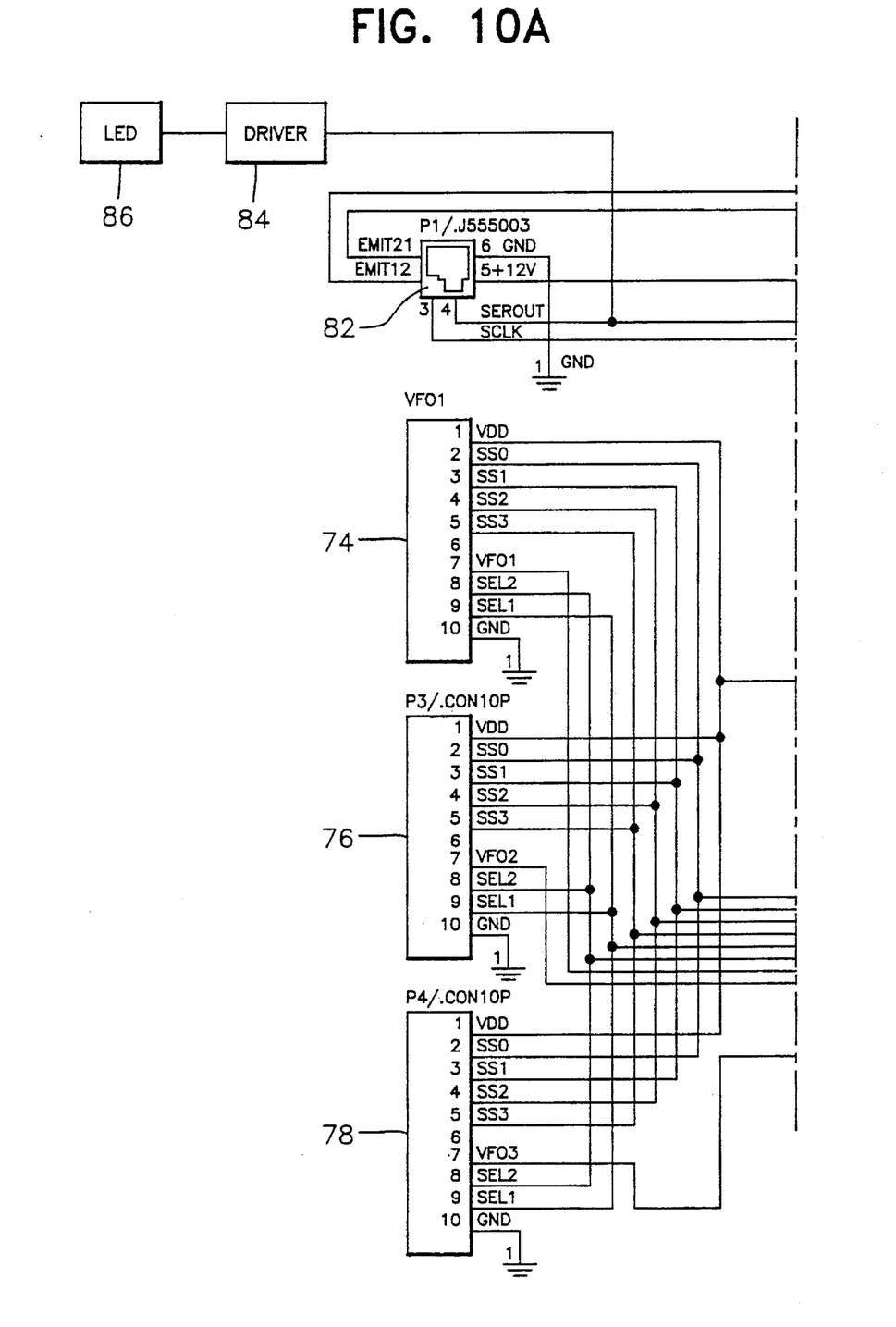
Figure 10B:
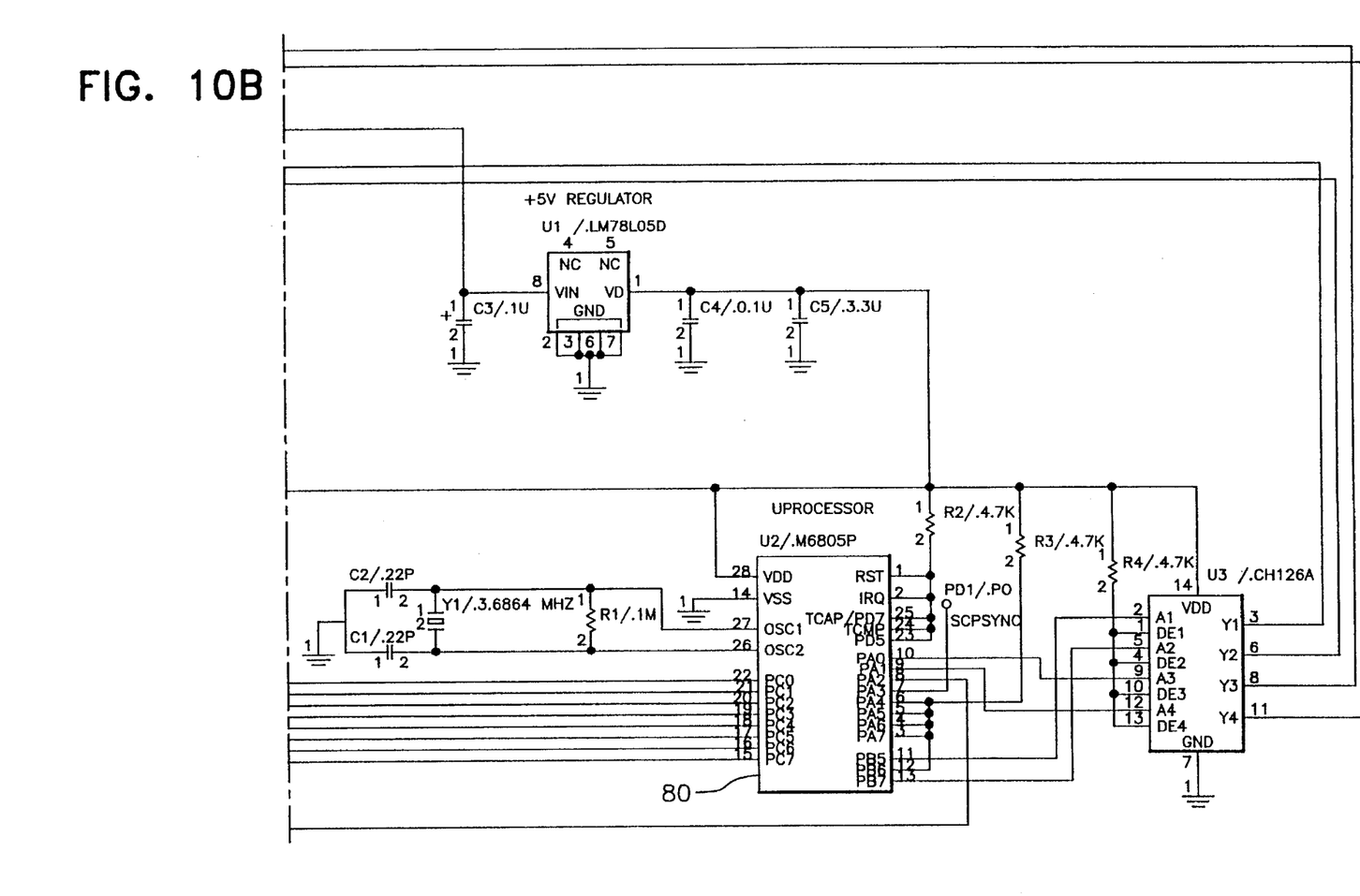

FIGS. 9 and 10 illustrate the electronics of the remote unit. The measurements made by the roll detector 56 and pitch and yaw detector 58 are transmitted to the base unit by a series of pulses, the spacing between which represent the values of Q1–Q4 and $I_0$, $I_{+45}$, $I_{-45}$, and $I_{90}$. Reference is made to U.S. patent application Ser. No. 07/886,087, filed May 21, 1992, which is incorporated herein by reference. The information reporting technique for the pitch and yaw information disclosed in the prior application is used in the same manner for transmitting the pitch, yaw and roll information in accordance with the present invention.

In this regard, the detectors 56 and 58 are connected to switches 70 and 72, respectively, which are operated to alternately connect the data Q1–Q4 and $I_0$, $I_{+45}$, $I_{-45}$, and $I_{90}$, to the data input pins of the state machine interface chip 73. Chip 73 processes the data, performs automatic gain control and generates an AMIC OUTPUT at the VFO pin. Depending on the number of photodetectors 50 used on a particular remote, more than one group of pitch, yaw and roll data may be processed by each of several interface chips, though only one interface chip 73 is shown for simplicity. Consequently, it may be necessary to interleave transmission of data from each chip to the base unit. Accordingly, one of several connectors 74, 76 and 78, (only connector 74 is shown in FIG. 9) connects microprocessor 80 to one of several state machine interface chips. The microprocessor chip 80 reads the output from each interface chip (one interface chip at a time) and generates a series of pulses for the data associated with each interface chip, the time spacing between consecutive pulses representing the photodetector data, either Q1–Q4 or $I_0$, $I_{+45}$, $I_{-45}$, and $I_{90}$.

As a result, the series of pulses consists of packets which are separated in time to allow for identification of each packet. A packet will consists of a series of pulses which represent Q1–Q4 or $I_0$, $I_{+45}$, $I_{-45}$, and $I_{90}$. Thus, one packet represents pitch and yaw data, and another packet will represent roll data. A proper protocol can be established, using techniques well known in the art, to separate and identify each of the packets at the base unit.

The pulse packets may be transmitted to the base unit by a hardwire connection, via an RS232 output terminal 82, or the packets may be transmitted wirelessly through a driver 84 and LED 86, as disclosed, in U.S. Pat. No. 5,045,843.

Figure 11A:
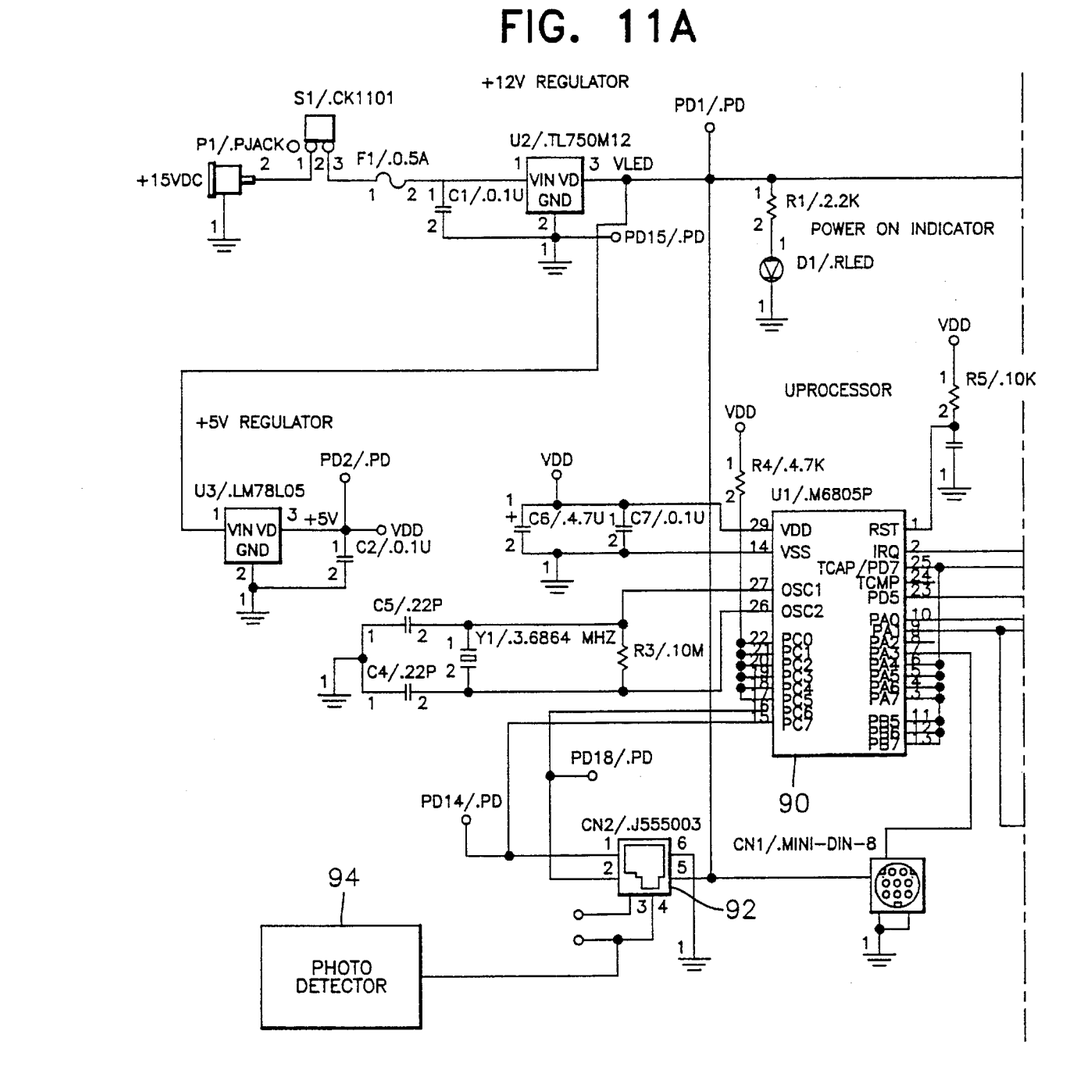
FIG. 11 is a schematic diagram of the base unit in accordance with the present invention.
Figure 11B:
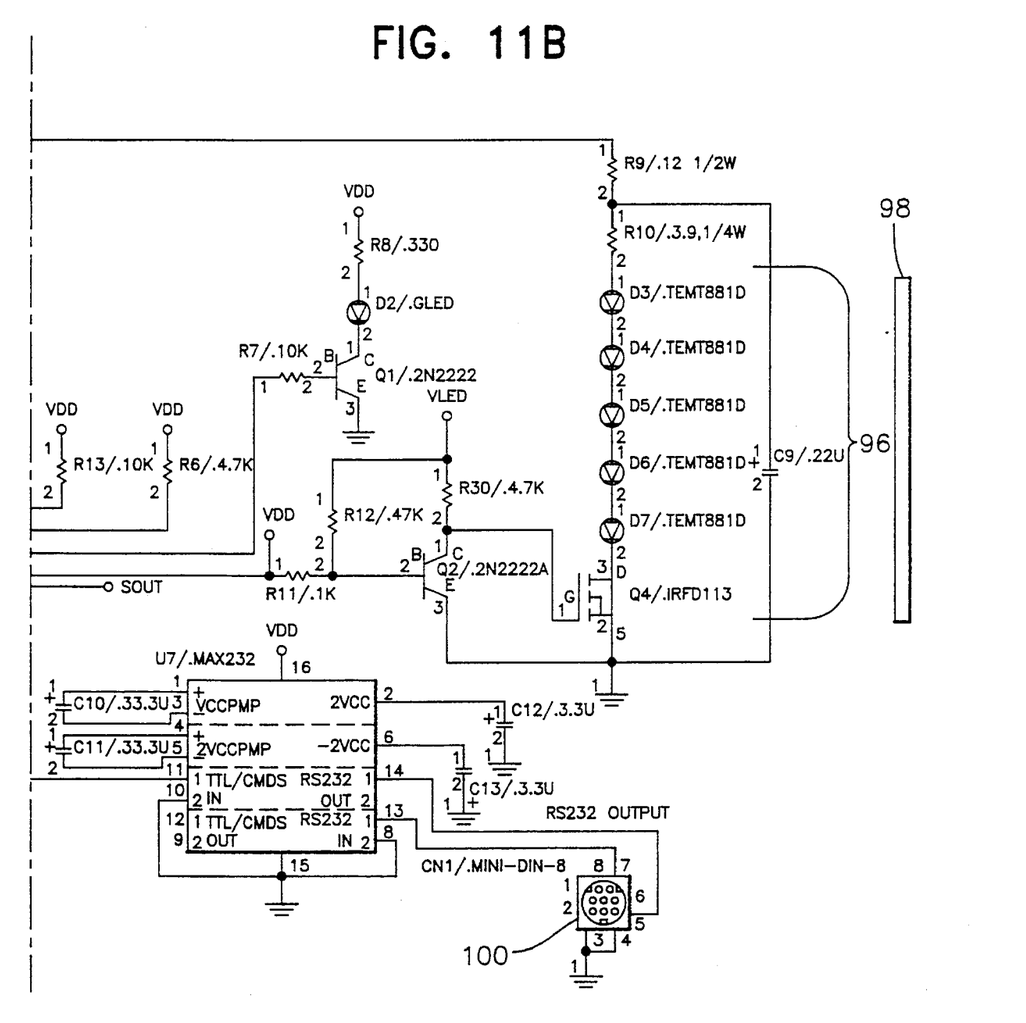

FIG. 11 illustrates the electronic circuitry of the base unit 12. The base unit 12 is controlled by a microprocessor 90, and receives data either through an RS232 input terminal 92 or via a photodetector 94. The time spacing between the series of pulses is interpreted by the microprocessor to reconstruct the values of Q1–Q4 and $I_0$, $I_{+45}$, $I_{-45}$, and $I_{90}$. This is described in the pending patent application mentioned above. The microprocessor 90 ultimately determines the corrected pitch and yaw of the remote unit, according to the mathematical equations described above.

The base unit 12 also includes several LED's 96 which together serve to define a single light source. A polarizer 98 is placed over the LED's so as to generate, for example, horizontally polarized light, which is transmitted towards the remote unit and impinges on the photodetector 50.

The pitch and yaw data is supplied to an associated television or virtual reality system via an RS232 output terminal 100.

Figure 12:
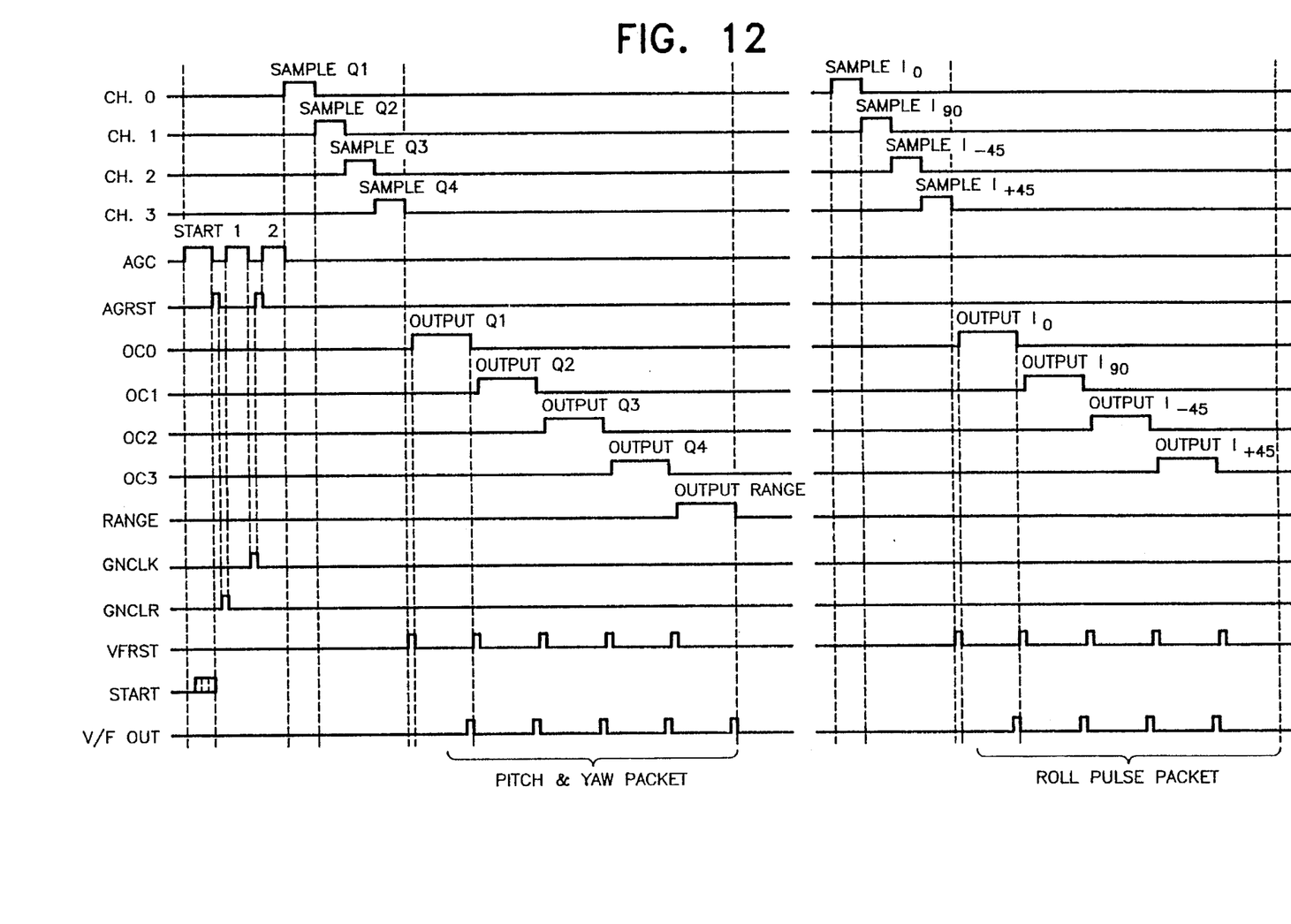
FIG. 12 is a timing diagram illustrating the generation and transmission of pulse packets for pitch and yaw, and roll data.

FIG. 12 illustrates the timing and generation of the pitch and yaw pulse packet and roll pulse packet. Again, reference is made to U.S. patent application Ser. No. 07/886,087, filed May 21, 1992, for a more detailed description of the generation of the pulses. The chip 73 can process data from one detector at a time. Therefore, the samples from, for example, the pitch and yaw detector 58 are selected first and are gated onto output channels OC0–OC3, together with a Range value representative of an automatic gain control level. The chip 73 then generates a series of pulses on the VFO pin (called AMIC OUTPUT in FIG. 9, labelled V/F Out in FIG. 12), the spacing between the pulses representing the values of the signals Q1–Q4. This first series of pulses defines the pitch and yaw pulse packet. Similarly, samples from the roll Detector 56 are gated onto the output channels OC0–OC3 and are ultimately converted into a series of pulses, the spacing between which represents the values of $I_0$, $I_{+45}$, $I_{-45}$, and $I_{90}$. A predetermined time delay or protocol may be provided between the two packets so that the base unit can determine when one packet ends and the next packet begins, and can also identify the data of each packet, pitch and yaw, or roll.

It should be understood that the pitch and yaw data and roll data could be transmitted to the base unit by other means, either optically or via hardwire. The foregoing is only an example of one way to consolidate the data and optically transmit it. By introducing a duty-cycle to the operation of the transmitter LED 86, power consumption is greatly reduced in the remote unit. This is important where the remote unit is wireless and battery operated.

Figure 13:
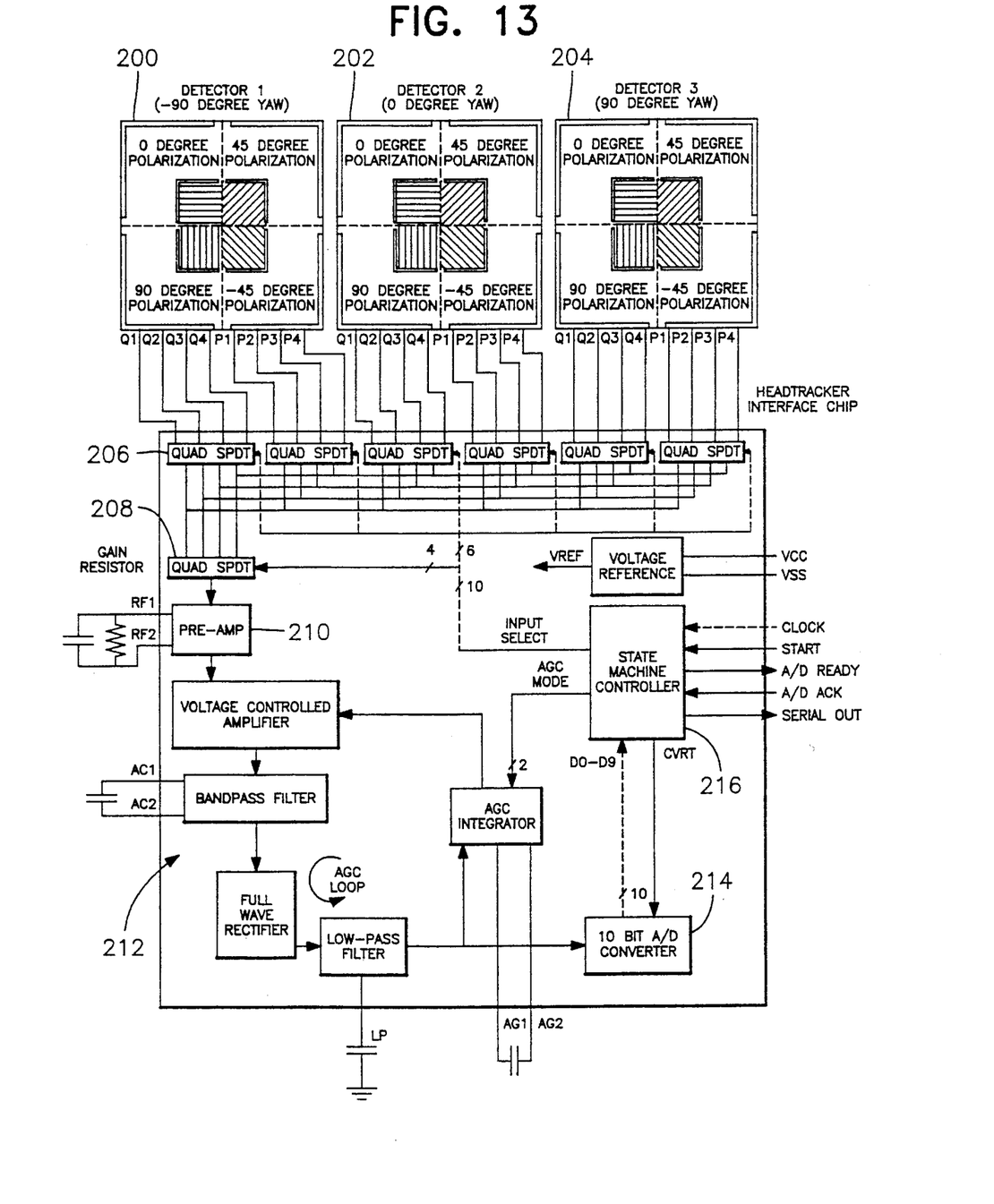
FIG. 13 is a block diagram of a remote unit in accordance with an alternative embodiment of the present invention.

FIG. 13 illustrates a block diagram of a remote unit according to another embodiment of the present invention. In this embodiment, there are multiple integrated detectors, each positioned and therefore assigned to a particular yaw angle. In addition, this type of remote unit may be designed for hardwire connection, and the data is transmitted to the base unit digitally.

Of particular importance, the integrated detectors may be assigned to particular orientations. For example, one detector 200 is positioned on the face of the remote at 0° yaw; one detector 202 is positioned on a side of the remote at −90° yaw; and another detector 204 is positioned on the opposite side of the remote at 90° yaw. Furthermore, each detector has a quad pitch and yaw detector and a quad roll detector, similar to detector 50 shown in FIG. 6. Consequently, each detector outputs pitch and yaw data Q1–Q4 and roll data, referred to here as P1–P4.

A bank of switches 206 gate the pitch, yaw and roll data to a four signal select switch 208. Only the four component pitch and yaw data or four component roll data is processed at once. Switch 208 selects in sequence the pitch and yaw data, then the roll data from each detector. This data is amplified by pre-amp 210 and then amplified again in an automatic gain control loop 212. Ultimately, the data, which is in analog form up to now, is converted to a 10-bit digital form by the 10 bit A/D converter 214. The 10-bit output D0–D9 of the A/D converter 214 is supplied to the state machine controller 216.

Unlike the operation of the remote unit shown in FIGS. 9 and 10, the remote unit of FIG. 13 converts the analog pitch, yaw and roll data to digital form almost immediately before it is transmitted to the base unit. The state machine controller 216 generates digital serial output pulses which represent the analog pitch and yaw data, or roll data. The digital signals are more easily transmitted at higher rates over the hardwire line to the base unit, and thus is a preferred method when the remote is to be hardwired to the base unit. This is particularly advantageous in virtual reality systems, where it is necessary to transmit new visual display tracking data very fast, for accurate real-time virtual reality display. In this regard, the functionality of the base unit may be incorporated into a virtual reality system.

As mentioned in the foregoing, the roll information may be used to rotate an icon or other graphical representation of an object in a graphical user interface on a computer or television screen. The rotation or roll of the remote unit is used to cause the icon or object, such as a knob icon, to rotate on the screen.

Figure 14:
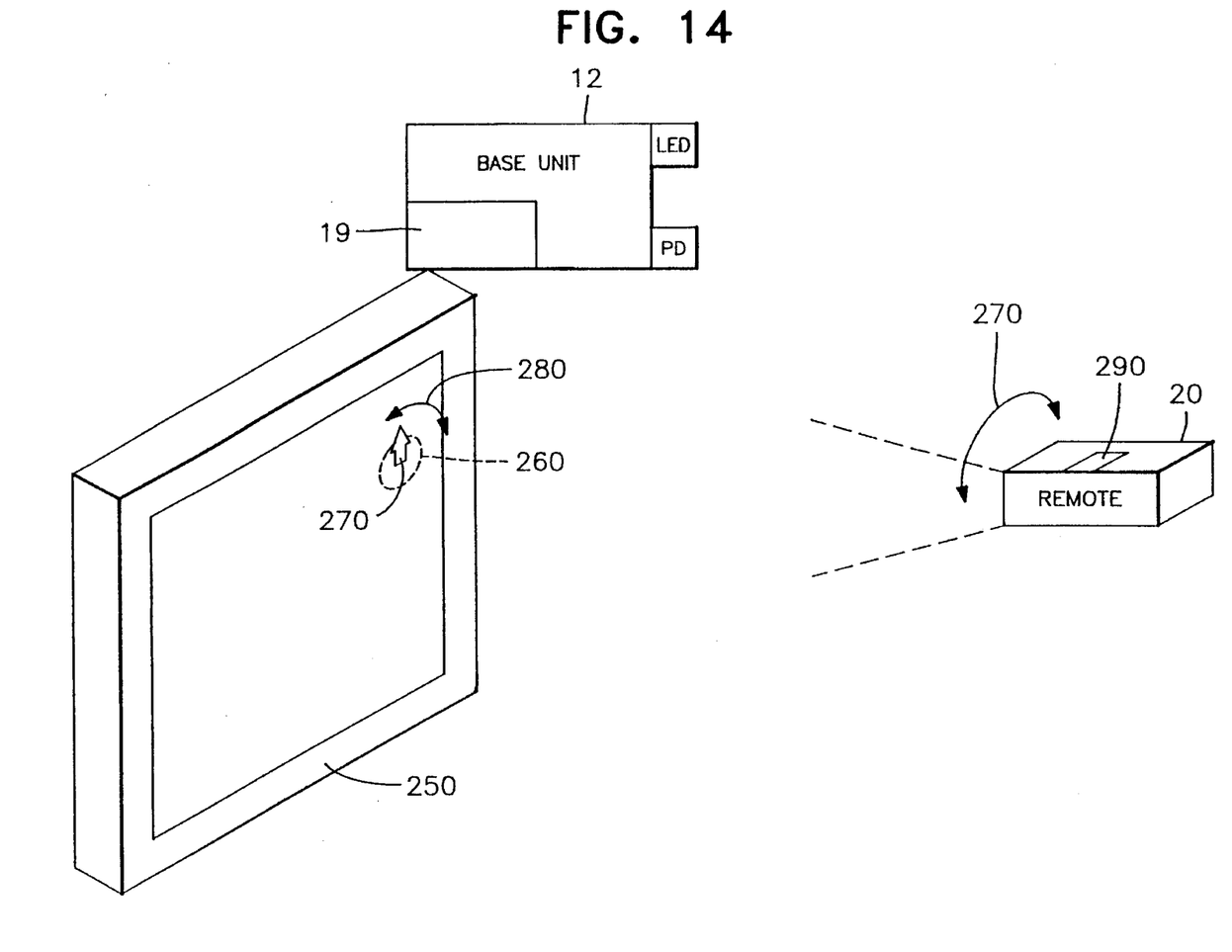
FIG. 14 is a block diagram of a system for optically rotating an icon on a screen by detecting roll of the remote unit.

FIG. 14 illustrates a remote unit 20, a base unit 12 and a display screen 250, such as a computer display screen or television screen. A computer generated icon or object, such as a knob, is shown at 260 on the screen 250. It may be desirable in certain instances, to rotate the knob 260. For example, in controlling a parameter on a television, such as volume. The remote unit 20 is pointed at the volume knob icon 260 to position the cursor 270 on the icon 260. A single "click" of a select button 290 on the remote frees the icon to rotate (arrow 280), with the degree of rotation being proportional to the roll angle of the remote unit 20. This interaction may be achieved in the familiar "click and drag" fashion used with a conventional hard-wired mouse, to allow the icon rotation to occur while the select button 290 is kept depressed. Alternatively, the icon may remain free to rotate until another button press "drops" it.

The roll information transmitted to the base unit 12 is processed similar to the pitch and yaw information by the cursor control circuit 19. It is to be understood that software interfaces may also assist in the display of various icons, and movement of the cursor with respect to those icons.

The roll information may be determined by the polarized emitter-detector configurations described in the foregoing, in which the remote unit transmits the roll information back to the a base unit. On the other hand, it is possible and may be preferable in certain instances, for the remote unit to transmit polarized light to a polarized detector on a base unit which can receive light to determine the roll of the remote unit relative to the base unit, without the need for the base unit to transmit light to the remote unit. Hence, this would be one way communication from the remote unit to the base unit associated with the screen.

It is to be understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appended claims.

I claim:

1. A system for determining the pointing orientation of a remote unit relative to a base unit, the system comprising:

a fixed base unit comprising at least one light source for emitting at least one light beam which light beam is polarized in at least one particular orientation;

a movable remote unit comprising photodetector means for detecting light emitted by said light source means of the fixed base unit, said photodetector means comprising means responsive to receipt of said polarized light beam for determining pitch, yaw and roll of the remote unit relative to the base unit; and means for transmitting signals related to the pitch, yaw and roll of the remote unit relative to the base unit to the base unit.

2. The system of claim 1, and further comprising computing means for computing a corrected pitch and yaw of the remote unit on the basis of the roll of the remote unit.

3. The system of claim 1, wherein said photodetector means comprises pitch and yaw detection means for generating signals related to the pitch and yaw of the photodetector of the remote unit relative to the light source of the base unit for zero roll angle, and roll detection means comprising polarized photodetector means for generating signals related to the roll angle between the light source and the photodetector.

4. The system of claim 1, wherein said light source of the base unit emits a single beam of light polarized in a plane, and the roll detection means comprises multiple photodetector surfaces each responsive to light polarized in different orientations relative to said plane.

5. The system of claim 1, wherein the base unit comprises one or more polarized light sources for emitting one or more polarized beams of light, and the remote unit comprises one or more photodetectors responsive to polarized light.

6. The system of claim 1, wherein the light source emits a light beam polarized in a plane, and said pitch and yaw detection means and the roll detection means are integrated into a single photodetector surface, said single photodetector surface comprising four inner quadrants each of which is responsive to light polarized in a particular plane relative to said plane for generating the signals related to the roll angle relative to the light source, and four outer quadrants responsive to light of any polarization and for generating signals related to the pitch and yaw of the photodetector of the remote unit with respect to the light source.

7. The system of claim 6, wherein the light source polarizes the light beam in a horizontal plane, and wherein the four inner quadrants of the integrated photodetector are responsive to light polarized at horizontal, vertical, and two mutually perpendicular planes 45 degrees between horizontal and vertical.

8. The system of claim 1, wherein the light source emits a plurality of light beams each polarized in different planes, and said photodetector means of said remote unit comprises a single photodetector surface responsive to light polarized in a particular plane.

9. The system of claim 8, wherein the photodetector means comprises at least two surfaces responsive to light polarized in different planes.

10. The system of claim 1, wherein said remote unit comprises means for generating first and second packets of pulses, the first packet of pulses representing the pitch and yaw of the remote, the second packet of pulses representing the roll of the remote, the spacing between the pulses representing components each of the pitch and yaw, and of the roll.

11. The system of claim 10, wherein said remote unit comprises optical means for transmitting the first and second packets of pulses optically to the base unit, and said base unit comprising photodetector means for detecting the pulses and converting the pulses to electrical signals for processing by said computing means.

12. The system of claim 1, wherein said remote unit comprises means for converting output of said photodetector means into signals representing pitch, yaw and roll of the remote unit, and means for transmitting said signals over a hardwire connection to the base unit.

13. The system of claim 1, wherein said means for transmitting comprises a light source, said base unit comprising a photodetector for receiving light emitted by said transmission means light source.

14. The system of claim 13, wherein said light source emits light pulses, the spacing between which represents the pitch, yaw and roll of the remote unit.

15. The system of claim 1, wherein said means for transmitting comprises a hardwire connection between the remote unit and base unit.

16. The system of claim 1, wherein the base unit is part of a virtual reality system.

17. The system of claim 1, and further comprising a computer display screen connected to the base unit, said base unit further comprising a cursor control circuit for controlling the position of a cursor on the screen.

18. The system of claim 2, wherein the computing means is in the base unit.

19. The system of claim 2, wherein the computing means is in the remote unit.

20. A system for remotely controlling the position of an icon or graphical object representation on a screen, the system comprising:

means for emitting at least one light beam from a position proximate the screen;

movable remote unit means for detecting the light beam and comprising means for determining at least a relative roll angle between the remote unit and the screen on the basis of the light beam, and generating signals representative of the roll angle, said movable remote means comprising transmitting means for transmitting the signals representative of the roll angle from the remote unit;

means for receiving the signals representative of the roll angle transmitted by the remote unit; and means for controlling the position of the icon or graphical object representation to rotate the icon or graphical object representation in response to the signals representative of the roll angle transmitted by the remote unit.

21. The system of claim 20, wherein the means for emitting comprises means for emitting at least one beam of polarized light and the means for determining comprises at least one polarized detector responsive to light of a particular polarization orientation.

22. The system of claim 20 wherein said icon is a pictorial representation of a knob.

23. A method for rotating a cursor or icon on a screen comprising the steps of:

emitting at least one light beam from a position proximate the screen;

detecting the light beam in a movable remote unit to determine at least a relative roll angle between the remote unit and the screen on the basis of the light beam, and generating signals representative of the roll angle;

transmitting the signals representative of the roll angle from the remote unit;

receiving the signals representative of the roll angle transmitted by the remote unit; and controlling the position of the icon to rotate the icon in response to the signals representative of the roll angle transmitted by the remote unit.

24. The method of claim 23, wherein said icon is a pictorial representation of a knob.

* * * * *